United States Patent
Cheng

(10) Patent No.: US 6,219,481 B1
(45) Date of Patent: Apr. 17, 2001

(54) OPTICAL FILTER

(75) Inventor: Yihao Cheng, Kanata (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/369,168

(22) Filed: Aug. 5, 1999

(51) Int. Cl.$^7$ .................................................. G02B 6/28
(52) U.S. Cl. ................. 385/47; 385/33; 385/45; 385/24
(58) Field of Search .................. 385/15, 24, 31–33, 385/38, 39, 42, 45, 47, 49, 50

(56) References Cited

U.S. PATENT DOCUMENTS 5,859,940 * 1/1999 Takahashi et al. ............... 385/34
5,917,626 * 6/1999 Lee .................................... 359/131
6,014,485 * 1/2000 Pan .................................... 385/37

FOREIGN PATENT DOCUMENTS 10-48459 * 2/1998 (JP) .

* cited by examiner

Primary Examiner—John D. Lee
Assistant Examiner—Michelle R. Connelly-Cushwa
(74) Attorney, Agent, or Firm—Neil Teitelbaum

(57) ABSTRACT

This invention discloses and optical filtering arrangement wherein a filter element having a coated substrate is disposed such that its ports on one side face the substrate instead of facing the coating upon the substrate. Hence, when the filter is positioned a distance from the ports, its coating side faces away from the ports while its substrate faces the ports. In this arrangement stress applied by adhesives or solder upon the coating can be eliminated.

12 Claims, 4 Drawing Sheets

Figure 4
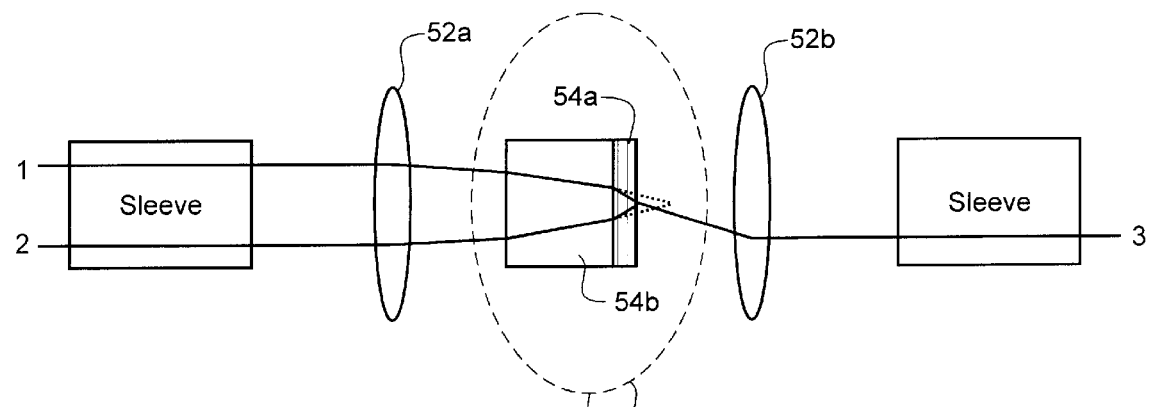
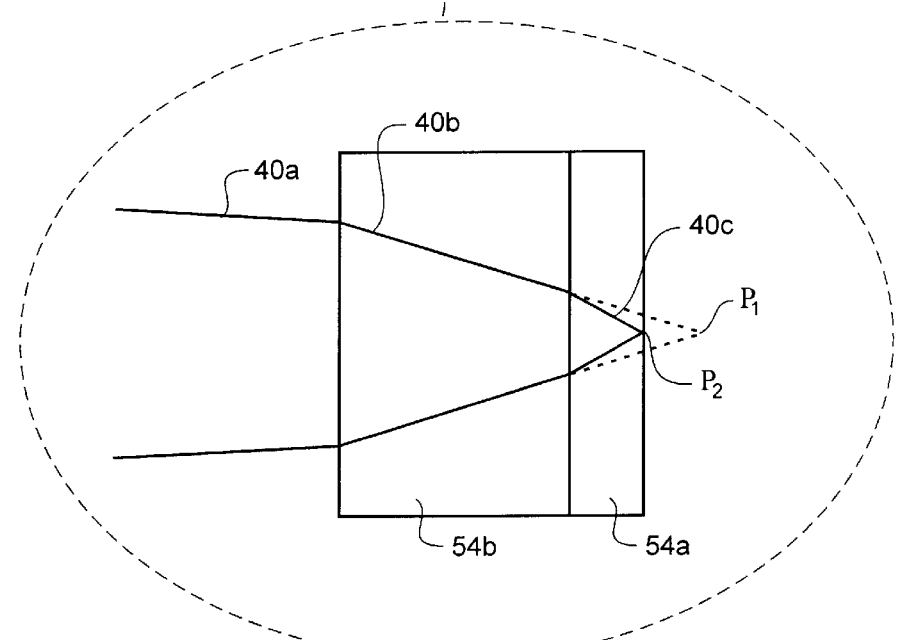
Figure 5

OPTICAL FILTER

FIELD OF THE INVENTION

This invention relates generally to an optical filter, and more particularly to an optical filter carried by a substrate.

BACKGROUND OF THE INVENTION

Optical filters are nearly ubiquitous elements in the field of optical communications. Optical filters are used for both multiplexing and demultiplexing, routing, attenuating, encoding, and decoding optical signals. Since optical signals are generally carried over long distance by optical fibres, optical filters are coupled in a well-known manner with the optical fibres, such that a filter assembly will be disposed in-line and between at least a pair of optical fibres. However, in some instances, these filters are configured such that they are essentially one-sided devices. For example, two wavelengths may be launched into a one sided device having two optical fibres at a same end; in this instance one wavelength may be extinguished wherein another wavelength will passed from one optical fibre to the other. Alternatively, a single sided optical filter may serve to attenuate light passing therethrough. In order to efficiently couple light from an optical fibre to a filter and back to an optical fibre, a lens is required; otherwise the light exiting an end face of an optical fibre will diverge and much of the light will be lost. It is generally desired to provide a collimated beam to a filter element or more particularly to the filter coating or layers. In view of this, optical filter assemblies usually comprise at least two optical fibres housed within a sleeve and one or more lenses disposed between a filter coating and the optical fibres for collimating light destined for the filter coating and for focusing light directed toward one of the optical fibres.

Optical filters such as dichroic filters are typically comprised of many layers of light transmissive high and low index material arranged to form optical cavities; the layers are extremely thin, and are in the order of the wavelength of light passing therethrough. These layers are coated or deposited on a light transmissive substrate that serves as a carrier or support for the ultra-thin coating.

Over the years, graded-index (GRIN) rod lenses have been widely used in the optics industry. They are convenient to use, and can be modified by polishing and end thereof. For example, if a pitch of a GRIN lens is too long, and requires shortening, the end face of the lens can be polished to shorten its length and effectively lessen its pitch. Due to the convenience and relatively low cost of GRIN lenses, they are most often the element of choice when manufacturing small precision optical devices. In order to couple one or more optical fibres to a GRIN lens, a fibre tube or sleeve is used having a complementary end face to and end face of the GRIN lens to which it is to be coupled. Adhesive such as epoxy is sometimes used to fixedly couple the tube with the lens in a preferred position. Heat cured epoxies are also used and tend to provide a strong immovable bond between the optical fibre sleeve and the GRIN lens. It is a well known practice, to use a similar adhesive such as UV cured adhesive, a heat cured adhesive, or metal or glass solder to fix an optical filter such as a dichroic filter to a GRIN lens or sleeve to an optical filter. However, one concern related to this practice that this invention addresses is the stress induced upon the ultra-thin coating applied to the carrier substrate. When adhesive cures, it tends to shrink and apply untoward forces upon the surface to which it is in contact with. However, for obvious reasons, it has been common practice to apply adhesive between an end face of a rod lens and filter layers to which the lens is to be coupled with.

It is an object of this invention, to lessen or obviate these problems associated with applying adhesive to the outer filter coating of a coated light transmissive substrate.

When light impinges and interacts within a multi-layer multi-cavity dichroic optical filter, the beam is often shifted within the filter layers. If this shift is not taken into account when aligning input and output optical fibres, optimum coupling will not result. One aspect of this invention addresses this problem and provides an elegant solution to optimizing coupling at the same time as obviating the requirement to apply adhesives to the coating layer of a filter.

It is therefore an object of this invention, to provide an optical filter that is less susceptible to stress and that provides suitable coupling between input and output waveguides.

SUMMARY OF THE INVENTION

In accordance with the invention, there is provided, an optical device comprising:

a first and a second optical fibre;

an at least partially reflective optical element including a coating disposed on a light transmissive substrate, the at least partially reflective optical element having a substrate side and a coating side;

a lens disposed to receive a beam from one of the fibres to provide a collimated beam at the coating, the substrate side of the at least partially reflective optical element disposed so as to face first and second fibres and the lens, the coating side facing away from the first and second fibres.

In accordance with the invention, there is provided an optical filter comprising: a substrate having a wavelength selective optical filter coating on one side thereof, and being absent a wavelength selective optical filter coating on the other side thereof;

a lens facing the other side of the substrate, absent the wavelength selective coating;

a pair of optical fibres adjacent and parallel to one another disposed to provide light to the optical filter through the lens or to receive light from the optical filter thorough the lens, such that light launched toward the filter through the lens from one of the optical fibres first traverses the other side of the optical substrate absent the coating, and subsequently impinges upon the side of the substrate having the wavelength selective coating.

BRIEF DESCRIPTION OF THE DRAWINGS

Exemplary embodiments of the invention will now be described in conjunction with the drawings in which:

FIG. 4 is a side view of a three-port optical filter in accordance with the invention wherein a shift in the beam induced by the filter coating is illustrated;

FIG. 5 is shows a larger view of a portion of the filter shown in FIG. 4; and,

DETAILED DESCRIPTION

Figure 1:
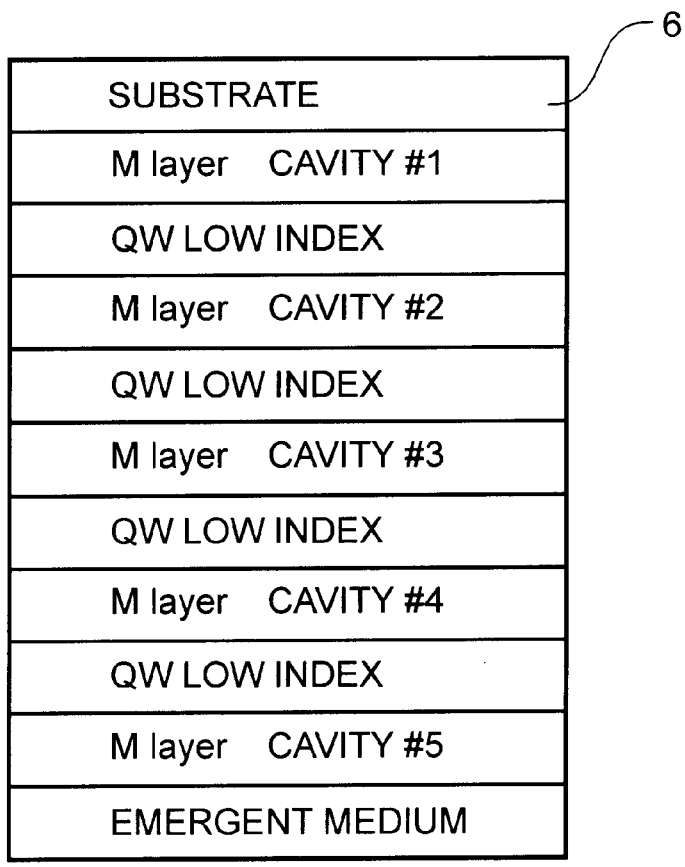
FIG. 1 is a cross sectional view of a prior art bandpass filter ensemble.

Turning now to FIG. 1, a conventional optical filter is shown having 5 cavities, each cavity having M layers including the outermost cavities.

The substrate 6 is transparent over the wavelength of interest. It may be made from a wide variety of materials including but not limited to glass, quartz, clear plastic, silicon, and germanium. The dielectric materials for this application have indices of refraction in the range 1.3 to greater than 4.0. The preferred materials are Magnesium Fluoride (1.38), Thorium Fluoride (1.47), Cryolith (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Other dielectric materials would serve as well.

A more detailed description of optical filters is found in U.S. Pat. No. 5,719,989 entitled MULTILAYER THIN FILM BANDPASS FILTER in the name of David H. Cushing, incorporated herein by reference.

Figure 2:
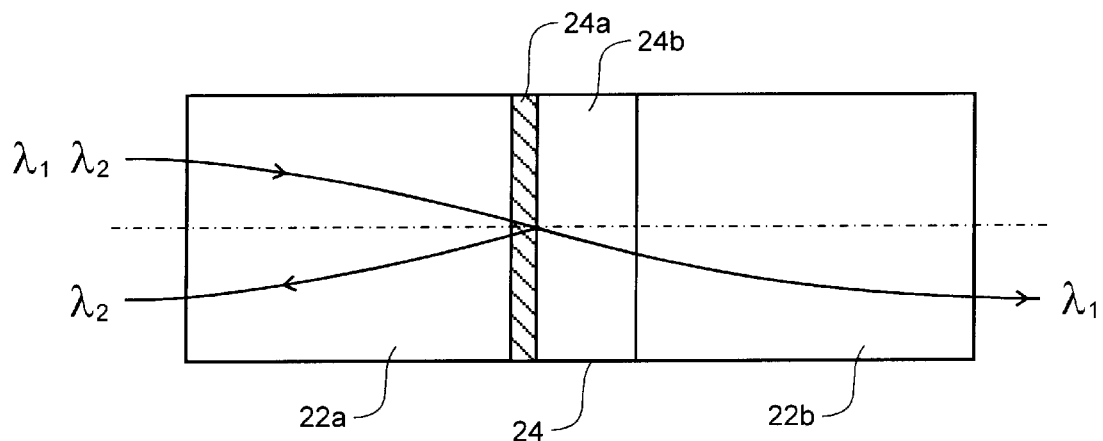
FIG. 2 is a side view of a prior art WDM 3-port optical filter.

Turning now to FIG. 2, a three-port prior art WDM filter is shown. The filter 20 includes a pair of back-to-back quarter pitch collimating GRIN lenses 22a and 22b for providing a collimated beam of light to a filter element 24 disposed therebetween. The filter element includes a carrier substrate 24b and plural dichroic thin film layers 24a deposited thereon. The filter element 24 is oriented such that the light launched from the input optical fibre 19a towards the filter element 24, is incident upon the plural dichroic thin film layers 24a. Intuitively, this arrangement is understandable, and from a practical standpoint, this arrangement has made sense. For example, the light incident upon the filter is to be collimated, so by placing the filter as close to a quarter pitch collimating lens has been a logical solution in view of what was known about filter technology.

This invention departs from conventional thought related to the use of filters carried by a substrate, by orienting a filter element oppositely, such that the carrier substrate is closest to the end of the device that light is being launched from and reflected to, i.e. the input and output waveguide(s).

Figure 3:
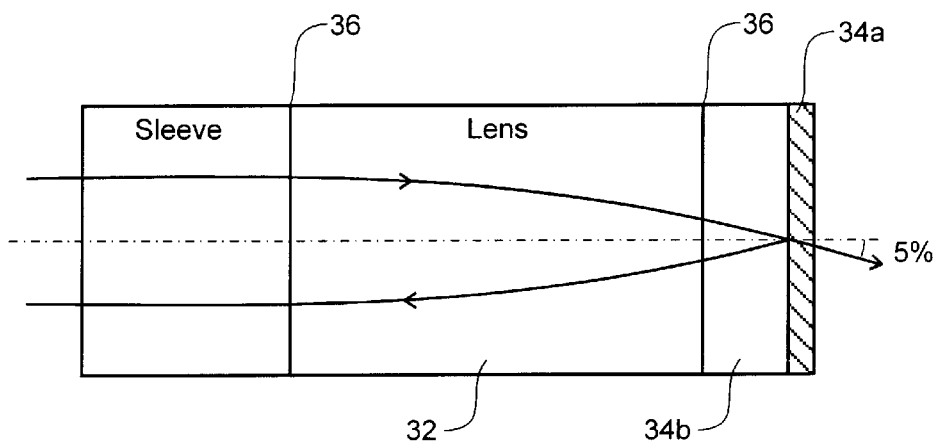
FIG. 3 is a side view of an optical filter in accordance with this invention.

Referring now to FIG. 3, an optical filter is shown having an attenuating filter element 34, which consists of a carrier substrate 34b and a coating 34a designed to attenuate light of a predetermined wavelength incident thereon, by passing or absorbing a small portion of the light that is to be attenuated, and by reflecting substantially most of the light that is to be captured.

In contrast to the prior art, the filter element 34 is oriented such that its carrier substrate 34b is adjacent the GRIN lens 32. The lens is polished to a pitch less than 0.25 that will provide a substantially collimated beam to the coating 34a on the filter 34. The substrate is adhesively fixed to the GRIN lens 32, thereby obviating any potential damage to the filter coating due to adhesively contacting the coating 34a as was done in the prior art.

Another advantage to the arrangement shown in FIG. 3 is that by carefully selecting the thickness of the substrate carrier, a beam shift induced by the filter layers can be compensated for such that optimum coupling can be achieved.

FIG. 4 illustrates an embodiment of the invention wherein a 3-port filtering system is provided. FIG. 5 is an enlarged view of the filter element, substrate 54b and coating 54a shown as two adjacent blocks, however the dichroic multi-layer filter is coated directly upon the substrate. With reference to both of these figures, it is apparent that a ray 40a of a collimated beam (not shown) changes angle upon entering the substrate 54b where the ray now 40b is directed toward a location P1, shown by the dotted line. However as the ray 40b propagates through the multi-cavity multi-layer coating 54a, the ray now, 40c becomes shifted and the focus point becomes P2, where it reflects backward to the second port of the sleeve. This shift of the of the beam, represented in the figure by the ray 40c, is in effect compensated for by the thickness of the substrate which must be appropriately selected to afford the best coupling between ports 1 and 2 of the device.

Figure 6:
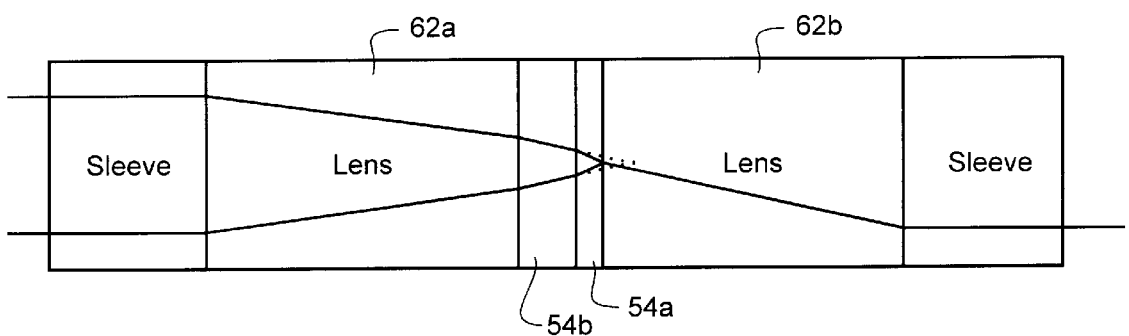
FIG. 6 is a side view of a three-port optical filter in accordance with this invention, wherein graded-index rod lenses replace the lenses shown in FIG. 4.

FIG. 6 shows a functionally same device wherein graded-index lenses 62a, 62b are used instead of lenses 52a, 52b shown in FIG. 4.

Of course, numerous other embodiments may be envisaged, without departing from the spirit and scope of this invention.

What is claimed is:

1. An optical device comprising:
   a first and a second optical fibre;
   an at least partially reflective optical element including a coating disposed on a light transmissive substrate, the at least partially reflective optical element having a substrate side and a coating side;
   a lens disposed to receive a beam from one of the fibres to provide a collimated beam at the coating, the substrate side of the at least partially reflective optical element disposed so as to face first and second fibres and the lens, the coating side facing away from the first and second fibres,
   wherein a thickness of the substrate is selected for offsetting a shift of a beam present in the at least partially reflective optical element.

2. An optical device as define in claim 1, wherein the device is a filtering system and wherein the at least partially reflective optical element is an optical filter.

3. An optical filtering system as defined in claim 2, wherein the lens is a graded-index lens.

4. An optical filtering system as defined in claim 3, wherein the graded index lens is coupled with the substrate side of the filter.

5. An optical filtering system as defined in claim 4, wherein an adhesive is present between the substrate side of the filter and an end face of the graded-index lens for coupling the filter with the lens.

6. An optical filtering system as defined in claim 1, wherein the first and second optical fibres are disposed within a sleeve.

7. An optical filtering system as defined in claim 6, wherein the sleeve is affixed with an the graded-index lens.

8. An optical filtering system as defined in claim 7, wherein the coating side of the substrate is absent any adhesive for coupling to an adjacent optical element.

9. An optical filtering system as defined in claim 6, wherein the sleeve is adhesively affixed with an end face of the graded-index lens.

10. An optical filter comprising:
    a substrate having a wavelength selective optical filter coating on one side thereof, and being absent a wavelength selective optical filter coating on the other side thereof;
    a lens facing the other side of the substrate, absent the wavelength selective coating;
    a pair of optical fibres adjacent and parallel to one another disposed to provide light to the optical filter through the lens or to receive light from the optical filter thorough the lens, such that light launched toward the filter through the lens from one of the optical fibres first traverses the other side of the optical substrate absent the coating, and subsequently impinges upon the side of the substrate having the wavelength selective coating, wherein a thickness of the substrate is selected for offsetting coupling losses that would occur due to shifting of a beam of light by the coating.

11. An optical filter as defined in claim 10, further comprising:

a second lens having a first end face and a second end face, the first end face facing the side of the substrate having the wavelength selective coating; and a third optical fibre disposed to receive light from the second lens, an end face of the third optical fibre facing the second end face of the second lens.

12. An optical filter as defined in claim 11, wherein the third optical fibre is optically coupled with one of the other optical fibres through the coated substrate.

* * * * *